US012656063B2

(12) United States Patent
Story et al.

(10) Patent No.: US 12,656,063 B2
(45) Date of Patent: Jun. 16, 2026

(54) STRUCTURE HANGER FOR REFRACTORY

(71) Applicant: MERKLE INTERNATIONAL, INC., Galena, IL (US)

(72) Inventors: Shawn E. Story, Deerfield, IL (US); Timothy Park, Dubuque, IA (US)

(73) Assignee: MERKLE INTERNATIONAL, INC., Galena, IL (US)

( * ) Notice: Subject to any disclaimer, the term of this patent is extended or adjusted under 35 U.S.C. 154(b) by 556 days.

(21) Appl. No.: 18/230,254

(22) Filed: Aug. 4, 2023

(65) Prior Publication Data

US 2025/0044031 A1 Feb. 6, 2025

(51) Int. Cl.
*F27D 1/00* (2006.01)
*F27D 1/14* (2006.01)

(52) U.S. Cl.
CPC ............. *F27D 1/004* (2013.01); *F27D 1/141* (2013.01)

(58) Field of Classification Search
CPC ................................. F27D 1/004; F27D 1/141
See application file for complete search history.

(56) References Cited

U.S. PATENT DOCUMENTS

| | | | | | |
|---|---|---|---|---|---|
| 2,622,433 | A * | 12/1952 | Jones | F27D 1/004 | 52/506.03 |
| 2,819,693 | A * | 1/1958 | Rath | F27D 1/141 | 110/339 |
| 3,431,693 | A * | 3/1969 | Stephens | F23M 5/06 | 52/506.03 |
| 3,812,798 | A | 5/1974 | Merkle, Jr. | | |
| 3,958,519 | A * | 5/1976 | Merkle, Jr. | F27D 1/142 | 110/332 |
| 4,317,418 | A * | 3/1982 | Courshon, Jr. | F27D 1/142 | 432/252 |
| 6,058,859 | A * | 5/2000 | Colosimo, Jr. | F27D 1/021 | 432/252 |
| 6,427,610 | B1 | 8/2002 | Coates et al. | | |
| 7,726,249 | B2 * | 6/2010 | Materna | F23M 5/00 | 110/332 |
| 10,845,122 | B2 | 11/2020 | Chambers | | |

* cited by examiner

*Primary Examiner* — David J Laux
(74) *Attorney, Agent, or Firm* — Pauley Erickson & Swanson

(57) ABSTRACT

A structure hanger for suspending bricks and brick structures in a high temperature furnace. The structure hanger has a plurality of column arms, at least one upper flange and at least one lower flange. Each column arm can extend between one upper flange and one lower flange of the structure hanger. Each column arm can have a curved shape. At least one lower flange can be removably attached or removably secured to a refractory brick flange of the brick.

19 Claims, 15 Drawing Sheets

STRUCTURE HANGER FOR REFRACTORY

BACKGROUND OF THE INVENTION

Field of the Invention

This invention relates to a structure hanger for a refractory brick and/or refractory bricks, such as in a high temperature furnace.

Discussion of Related Art

Different types of conventional high-temperature furnace constructions are often used in a wide variety of industries, for example, the production of glass, steel, oil and/or petrochemicals. Some conventional high-temperature furnaces are built or constructed from refractory bricks or firebricks and/or tiles and are often supported by metal structural frameworks. Many conventional furnace constructions include installations or constructions in monolithic and suspended or tieback refractory structures.

Some conventional high-temperature furnaces include interior structures of heat-resistant refractory firebricks and/or tiles. Such interior structures are often relatively heavy and require substantial support structures, such as a roof structure or a sidewall structure, and a heavy or substantial support frame which can be constructed from structural steel. Many conventional support frames include relatively large 1-beams and/or wide flange beams with smaller I-beams, for example 3-inch sized 1-beams, which can act as hanger beams, for example, positioned at right angles to the beams of the support frame.

U.S. Pat. No. 3,958,519 (the 519 Patent) discloses conventional technology, the entire disclosure of which is completely incorporated merely by reference into this specification. The 519 Patent shows a conventional refractory brick anchoring system having a support frame I-beam and a flange over which hanger beam clips engage.

One conventional method of hanging the refractory bricks to the hanger beams overcomes some of the above disadvantages with a bent rod type or ice tong shaped refractory hanger which is made as two separate pieces. One conventional rod type refractory hanger extends under the hanger flange on one side of the refractory brick and hooks on the opposite hanger beam flange. The other hanger extends under the hanger flange on the other side of the refractory brick and hooks on the other hanger beam flange and causes a tightening action as gravity weight is applied by the refractory bricks. While these conventional hangers prevent the refractory brick from sliding out of the hanger, they also cause the refractory bricks to break or fracture because of an immovability of the hanger bricks and the forces which result from expansion upon heating the furnace.

The 519 Patent teaches an angle refractory hanger 40 having two interlocked opposing U-shaped portions 42 and 45. Each U-shaped portion 42 has opposing flanges 41 and 47 extending inwardly from the end of each U-shaped leg and side 43 of U-shaped portion 42 connects the legs opposite from the opening between flanges 41 and 47. Flanges 46 and 48 engage hanger flanges 16 of refractory brick 13. The 519 Patent further explains the value of this design in relation to the conventional system shown in FIG. 1 of the 519 Patent.

The 519 Patent teaches two known U-shaped halves made from sheets of stainless steel that are welded together to maintain a conventional perpendicular orientation. The 519 Patent teaches refractory hangers that can engage with, for example, AISC S3 3" high steel beams, and there are also various known refractory hanger designs that engage with, for example, AISC S4 and S5 4" and 5" high steel beams.

SUMMARY OF THE INVENTION

These conventional systems have some commercial and technical deficiencies. For example, some users do not want the relatively thin metal construction of the conventional refractory hangers because they are not robust enough and some users desire a heavier duty version of the conventional refractory hangers. Also, the higher temperature field applications require higher grades of stainless steel, such as type 309 or 310 instead of the type 304. Further, the two U-shaped halves can separate from each other during shipping, handling and/or installation.

In order to address some of the deficiencies, it is possible to upgrade the material to type 309/310 stainless steel or a thicker type 304 stainless steel but this often results in a relatively high cost that is not cost effective for many of the field applications. It is possible to manufacture this by casting it in heat-resistant metal alloys, and in some field applications, the casting can withstand constant service high temperatures. Different foundries provide their own type of heat-resistant metal alloys where there is often no related industry standard or classification.

According to some embodiments of this invention, increased strength and lower internal stress levels are desirable. A casting according to the 519 Patent used the two U-shaped halves, merged them at a central plane, and increased a material thickness. Analysis of the casting according to the 519 Patent shows certain internal stresses at high temperatures. If higher loads or lower strength alloys are used with the casting according to the 519 Patent, failures could result.

In view of the limitations of a casting according to the 519 Patent, this invention includes several different embodiments based on using a steel beam and refractory contact flanges as fixed surfaces and arranging alternate structural paths between these two surfaces. Analysis according to castings of this invention show lower internal stresses which are acceptable when using certain other cast alloy types.

Castings according to different embodiments of this invention have some advantages over conventional castings. For example, a casting according to this invention reduces the maximum internal stresses significantly, for example, by eliminating the sharp transitions at the central plane in the casting according to the 519 Patent. According to different embodiments of this invention, this arrangement also reduces stress and allows the casting to be made from alternate materials, which cost less per pound. According to some embodiments of this invention, the casting specifications, for example, reduce the casting weight by almost 10% compared to a casting according to the 519 Patent. According to different embodiments of this invention, the casting requires a relatively large amount of casting part grinding after the casting process, for example, due to the complex nature of the tooling required to make the differently shaped casting. In other embodiments of this invention, the part grinding can be eliminated on the casting part primarily due to a simpler flow path through the foundry tooling.

BRIEF DESCRIPTION OF THE DRAWINGS

Some features and embodiments of this invention are apparent to those skilled in the art and are described in the following description taken in view of the drawings, wherein.

DETAILED DESCRIPTION OF INVENTION

This invention relates to a suspended roof construction and the same or similar roof construction can be used in a monolithic refractory construction and/or a tie-back wall construction. This invention also relates to refractory structures other than normal furnaces, for example, soaking pit covers, reheat furnaces, pelletizing furnaces, refractory lined reactors and/or refractory lined catalytic cracking units. The features of this invention can be used in any type of refractory brick structure.

U.S. Pat. No. 3,958,519 (the 519 Patent) teaches a high temperature furnace construction and hangers and all of its teachings and its entire disclosure is completely incorporated, by reference alone, into this specification. The 519 Patent shows one conventional refractory brick anchoring system having a support frame I-beam and a flange over which hanger beam clips engage. The conventional hanger beam clips slide over a flange from an end of the beam and each hanger beam clip engages one side of the flange of the hanger beam. The conventional hanger beam clips are secured by a bolt and an opposite hanger beam flange engages one slot of a refractory hanger with the refractory hanger slid over the flange from the end of the hanger beam. The opposite slot of the refractory hanger engages the hanger flanges of the refractory brick.

The 519 Patent teaches combinations of components or elements positioned so that the hanger flanges of the refractory brick are parallel to the hanger beam flanges. With the frequent requirement to slide the refractory hanger over the end of the hanger beam to engage it on the hanger beam flange, installation is difficult in such conventional systems because the refractory brick can slide out of the refractory hanger on a sloping roof or can vibrate out on a flat roof. Also, the cast form of the refractory hanger is relatively expensive and requires special heat-resistant materials that are not practical to use when cast or machined shapes are necessary.

In some embodiments according to this invention, structure hanger 40' as shown in FIGS. 1-15 and described in this specification, have some features and technical specifications that are different from but accomplish a similar or same result of suspending refractory bricks 13 in a high temperature furnace. Many different embodiments of this invention overcome some of the above-mentioned problems associated with conventional refractory hanger 40 as shown and described in the 519 Patent. In this specification, reference to refractory hanger 40 relates to a conventional apparatus of the 519 Patent whereas reference to structure hanger 40', as shown in FIGS. 1-15 of this patent application, relates to an apparatus according to different embodiments of this invention asset forth and described in this specification and in the claims.

Figure 1:
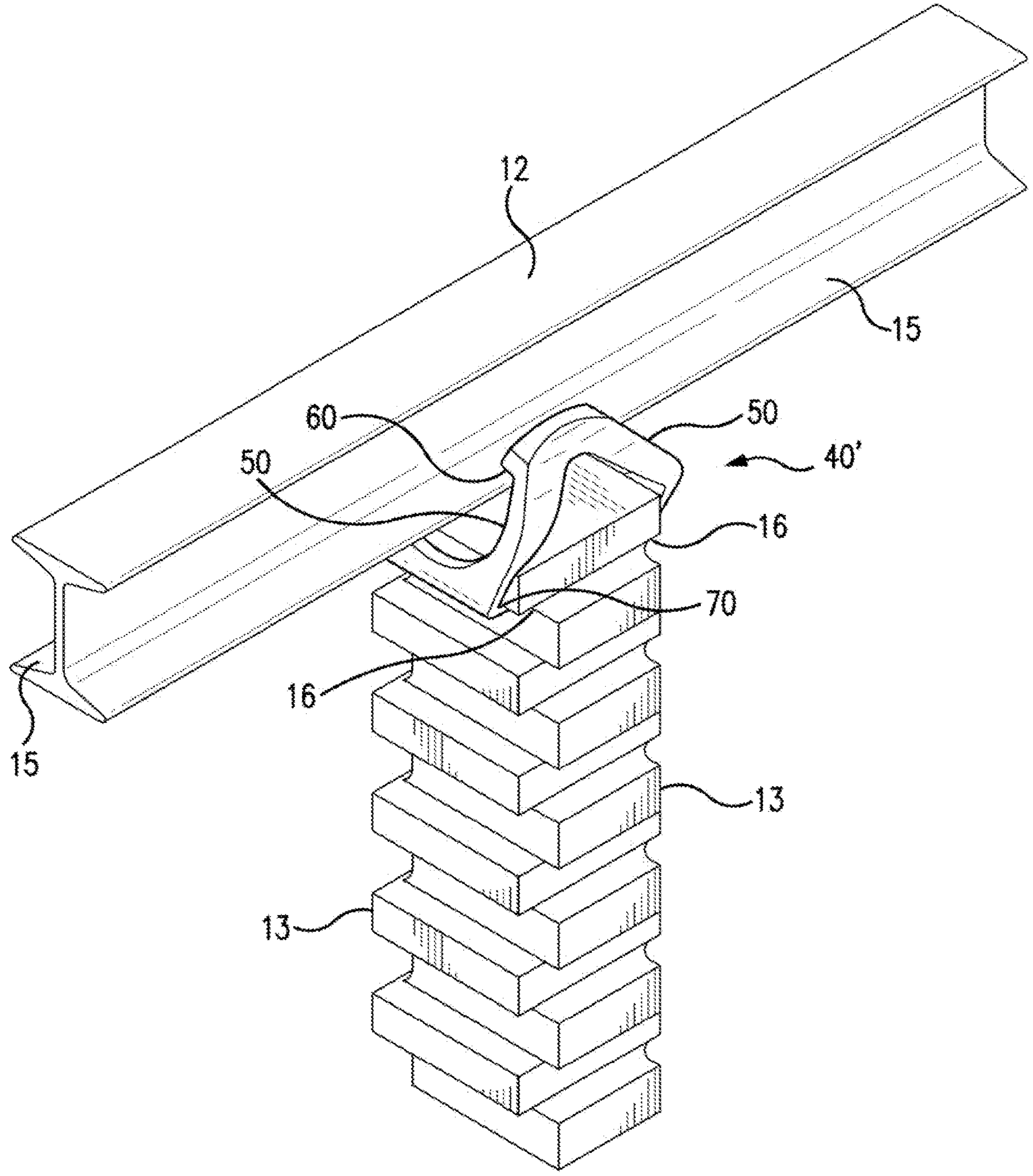
FIG. 1 is a perspective view of a support beam, a refractory brick and a structure hanger for the refractory brick, according to one embodiment of this invention.
Figure 2:
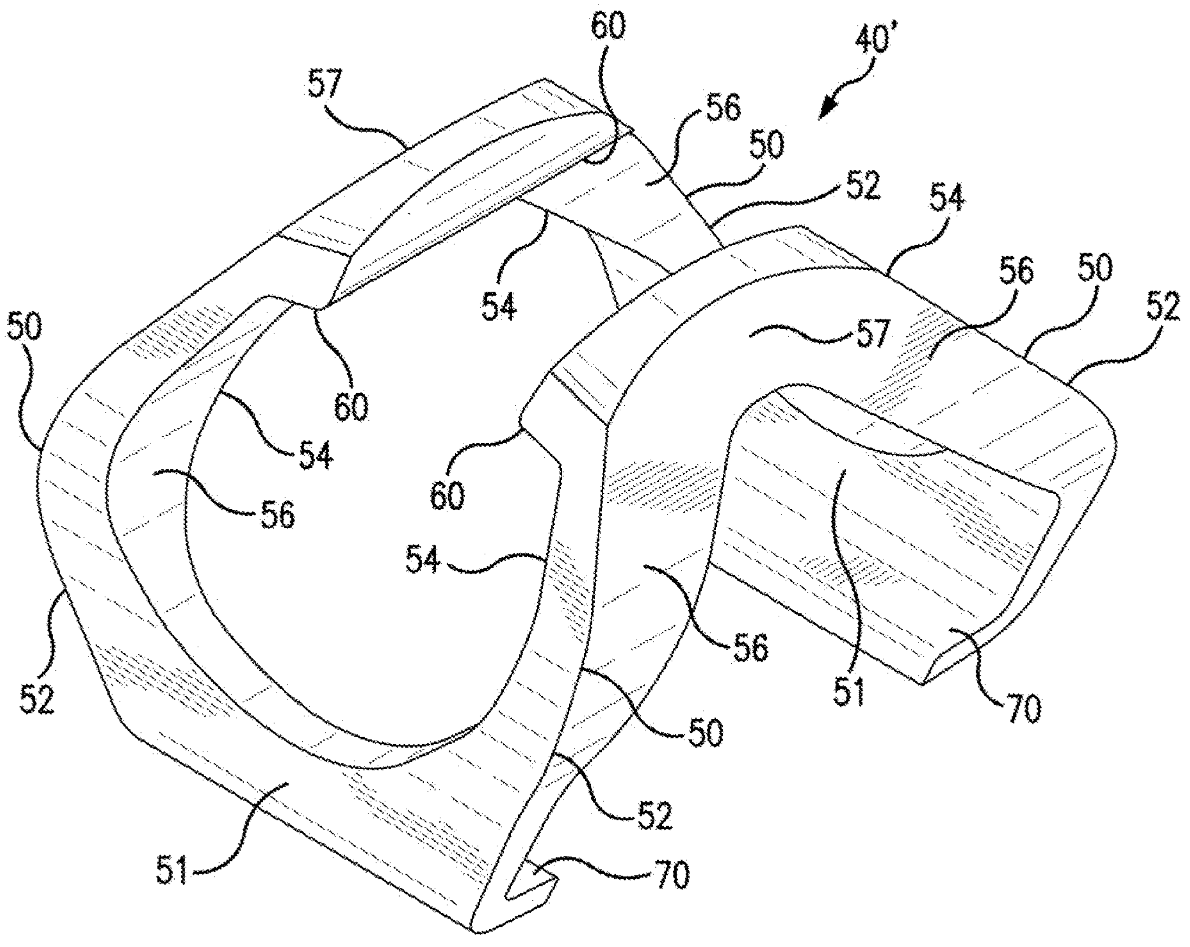
FIG. 2 is a perspective view of a structure hanger for a refractory, according to one embodiment of this invention.
Figure 3:
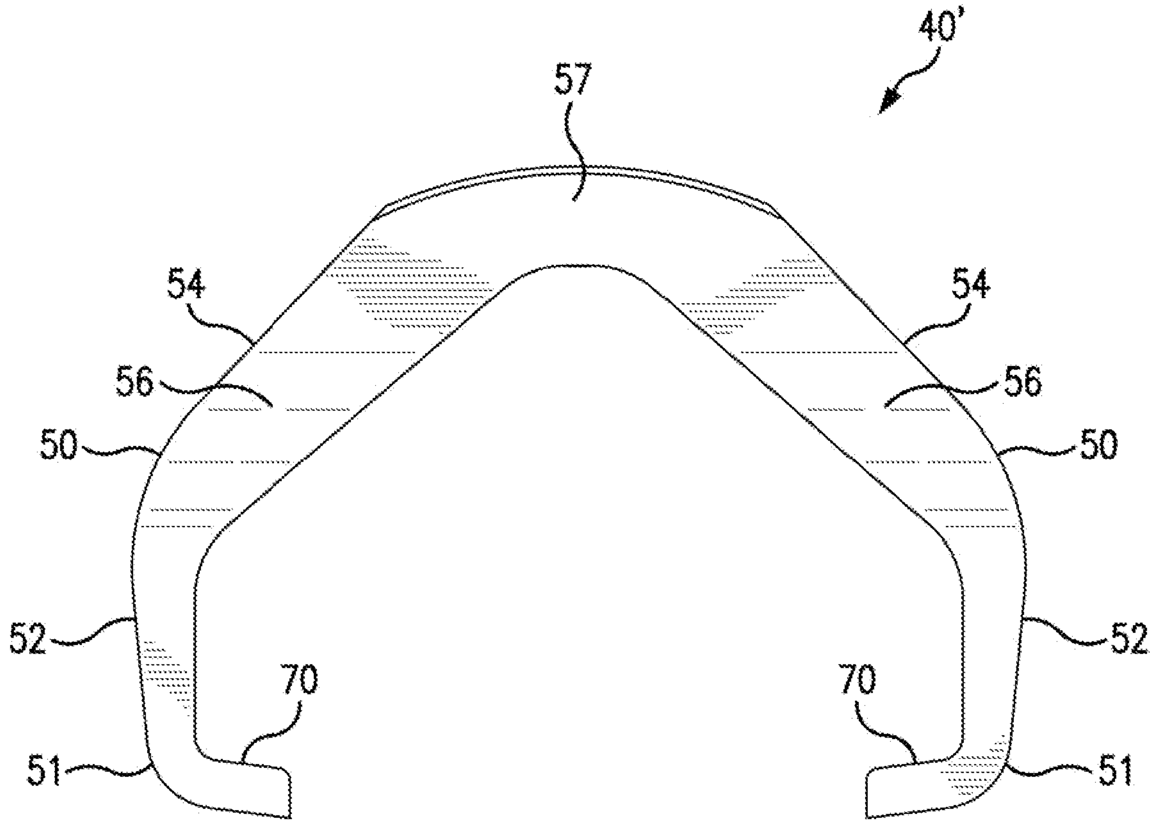
FIG. 3 is a side view of the structure hanger, as shown in FIG. 2.
Figure 4:
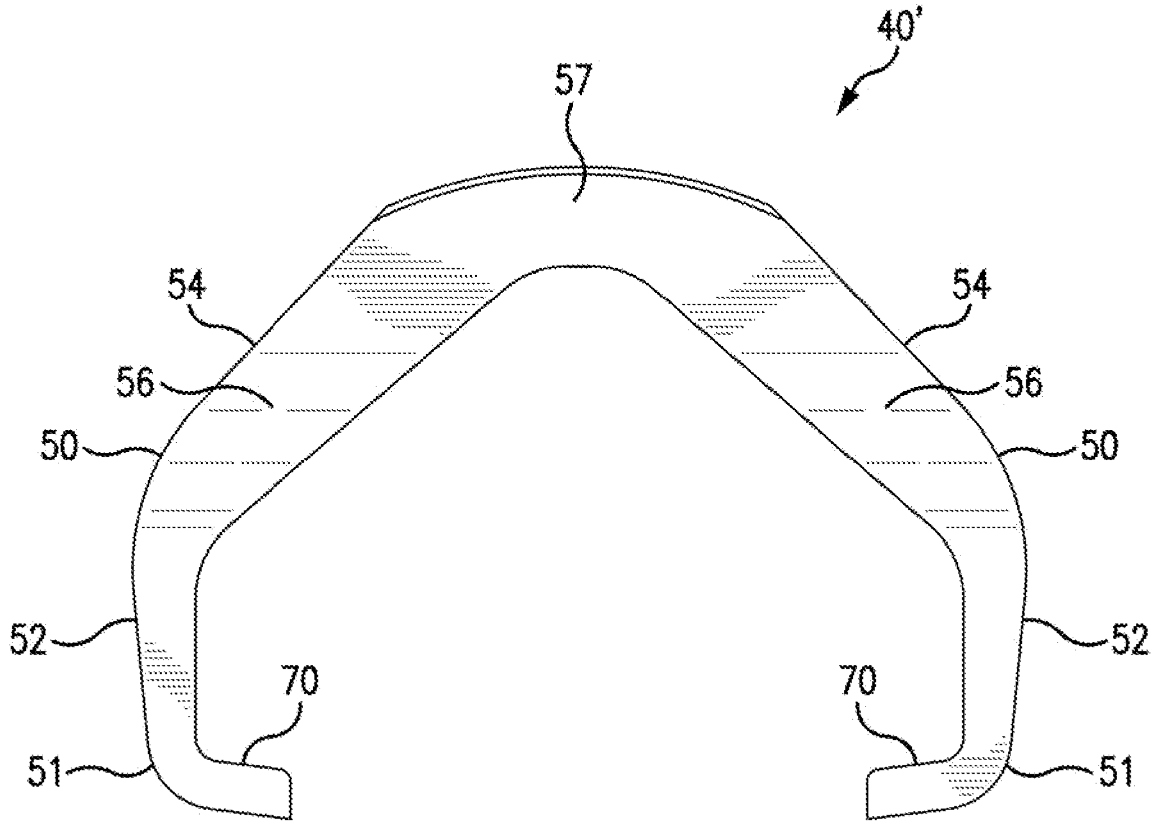
FIG. 4 is a side view, opposite the side view shown in FIG. 3, of the structure hanger.
Figure 5:
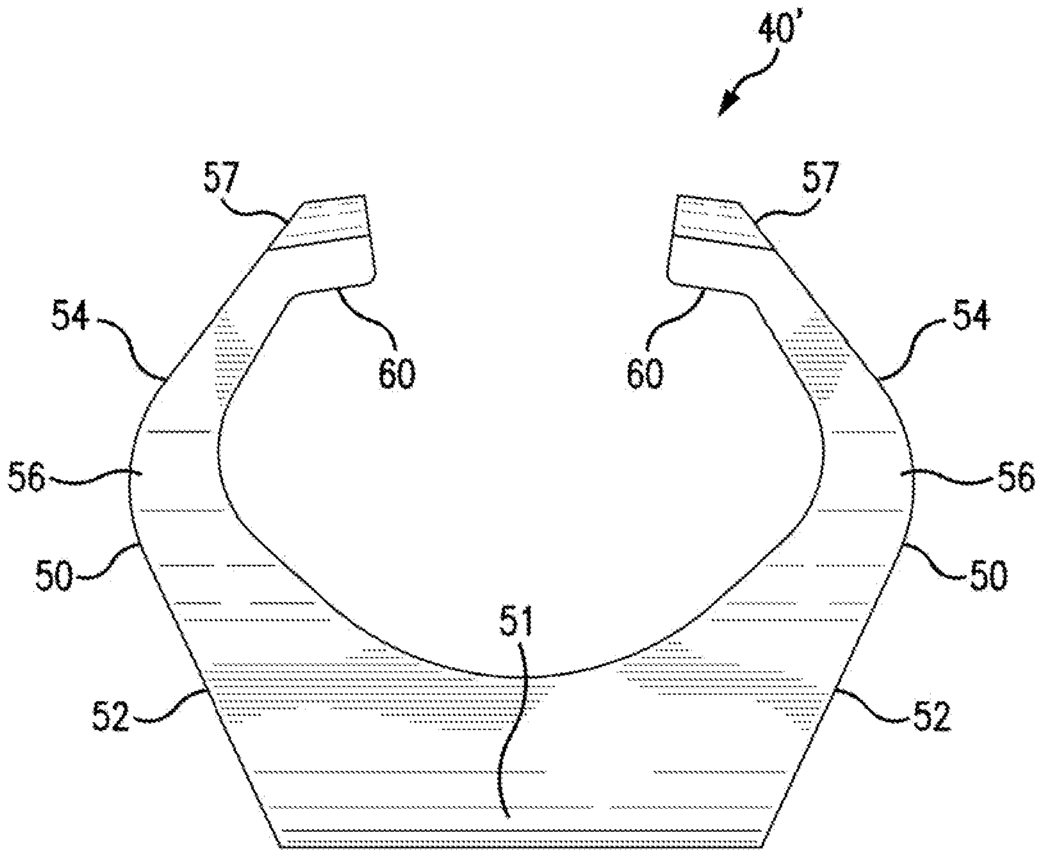
FIG. 5 is a front view of the structure hanger, as shown in FIG. 2.
Figure 6:
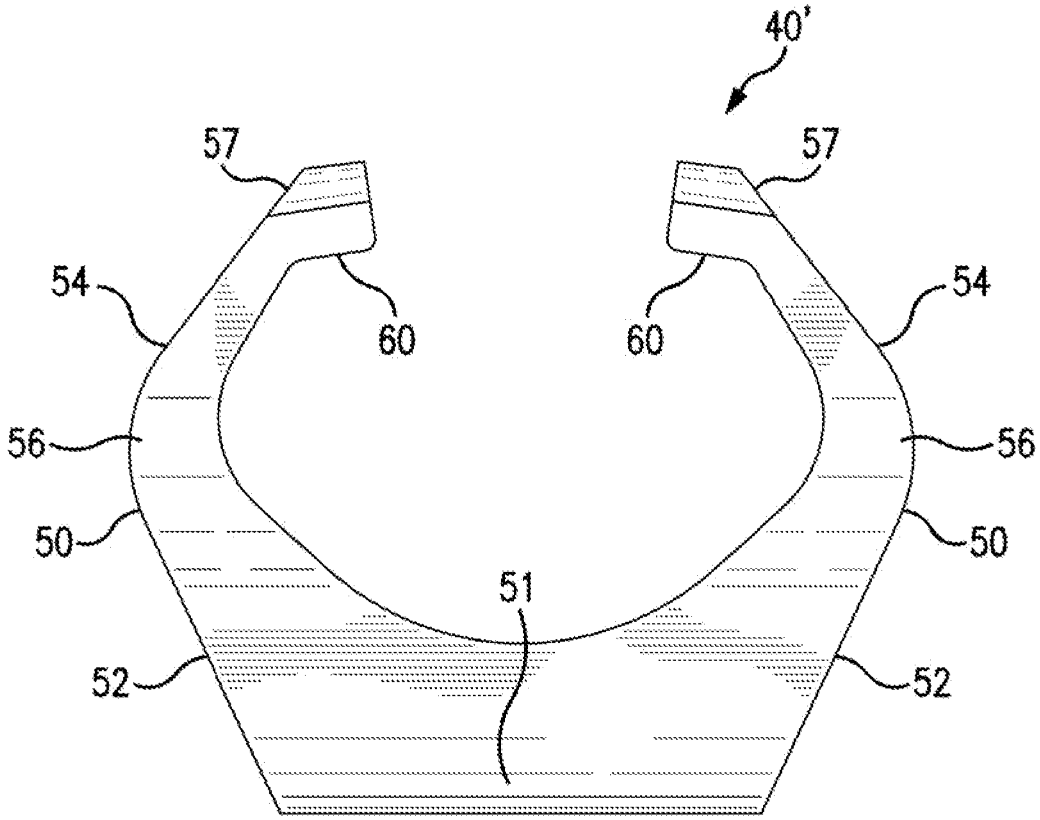
FIG. 6 is a rear view of the structure hanger, as shown in FIG. 2.
Figure 7:
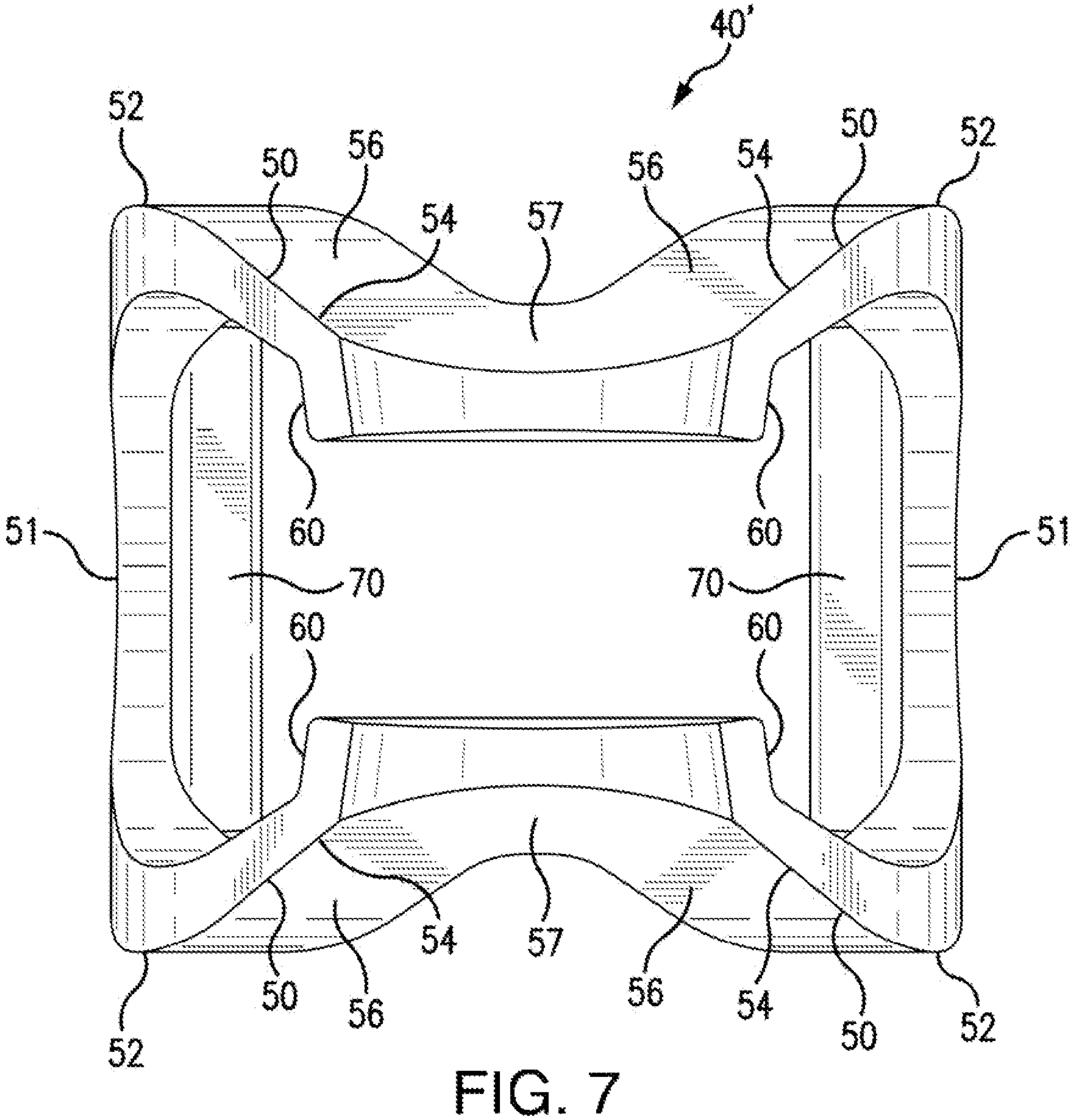
FIG. 7 is a top view of the structure hanger, as shown in FIG. 2.
Figure 8:
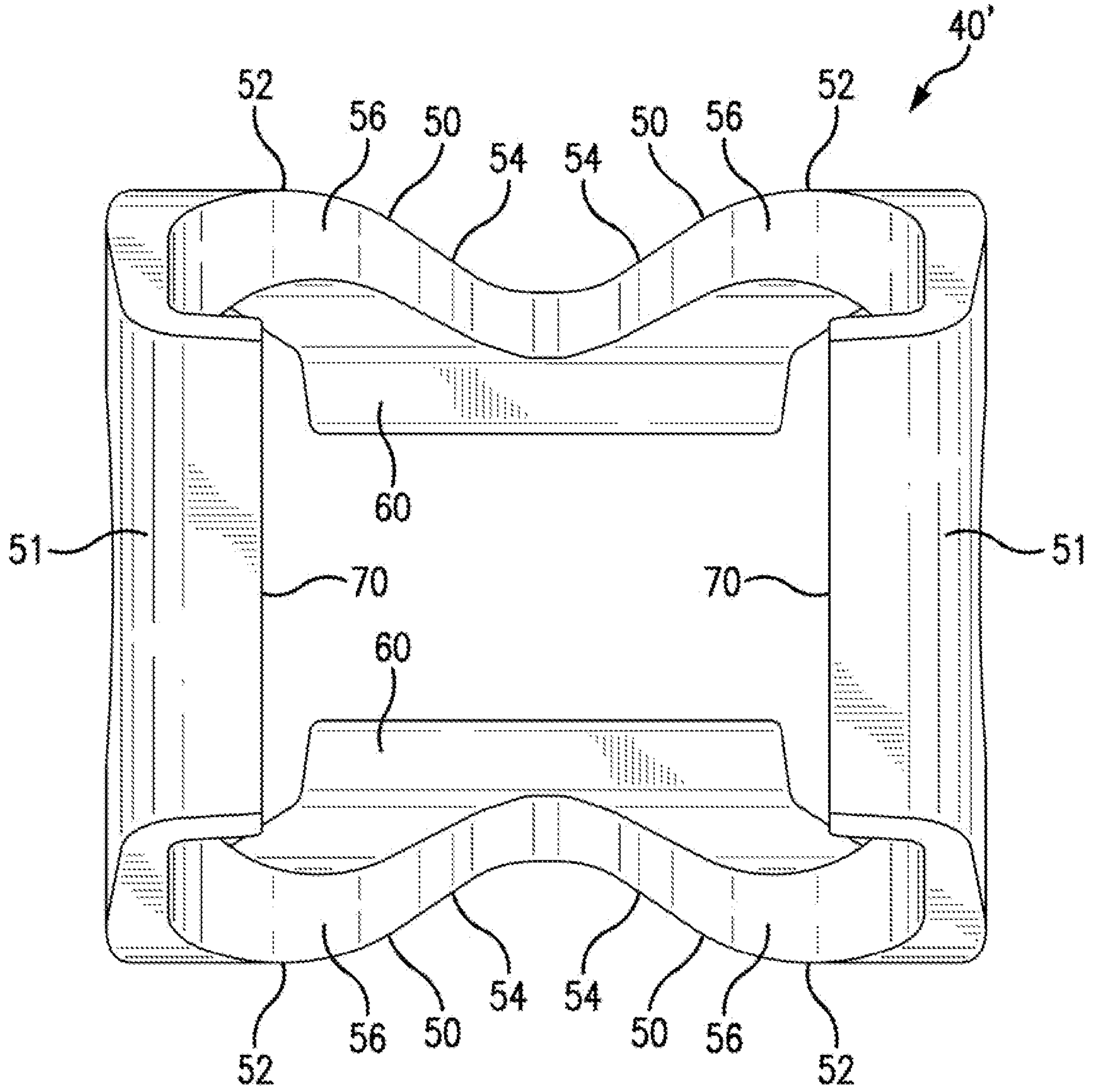
FIG. 8 is a bottom view of the structure hanger, as shown in FIG. 2.

In some embodiments according to this invention, structure hanger 40' replaces or can be used in lieu of refractory hanger 40 as shown in FIG. 2 of the 519 Patent. Thus, according to some embodiments of this invention, structure hanger 40' is used to suspend refractory brick 13 from and/or with respect to hanger beam 12. FIG. 1 of this invention shows one embodiment of structure hanger 40' releasably attached, connected and/or otherwise secured to and between refractory brick 13 and hanger beam 12, to form a connected hanging structure that can be used, for example, in a high temperature furnace. Any suitable structural and/or mechanical connection, known to those skilled in the art of refractory structures, can be used to form a releasable connection between structure hanger 40' and refractory brick 13 and/or hanger beam 12.

FIGS. 2-15 of this invention show different embodiments of structure hanger 40' comprising a plurality of column arms 50, at least one upper flange 60, at least one lower flange 70, each column arm 50 extending between upper flange 60 and lower flange 70, and each column arm 50 having a curved shape. In some embodiments of this invention, as clearly shown in FIGS. 2 and 9, between base portion 51 and top portion 57 each column arm 50 has a non-linear and/or a curved shape that allows each column arm 50 to be routed and/or transition from column arm 20 within a first spatial plane, such as nearby and/or close to base portion 51, and directed to column arm 20 within a second spatial plane, such as nearby and/or close to top portion 57. In some embodiments of this invention, column arm 50 having a non-linear and/or curved shape allows upper flange 60 to be perpendicular and/or generally perpendicular to lower flange 70.

In some embodiments of this invention, column arm 20 of structure hanger 40' has two upper flanges 60 and two lower flanges 70. According to some embodiments of this invention, upper flanges 60 are parallel and/or generally parallel to each other and/or lower flanges 70 are parallel and/or generally parallel to each other. In some embodiments of this invention, upper flanges 60 are generally parallel to each other and lower flanges 70 are generally parallel to each other, and having upper flanges 60 generally perpendicular to lower flanges 70 allows structure hanger 40' of this invention to replace and/or be used in lieu of refractory hanger 40 as shown in FIG. 2 of the 519 Patent. Thus, in some embodiments of this invention, using structure hanger 40' in place of refractory hanger 40 allows structure hanger 40' to be manufactured and/or constructed of relatively lower-cost materials, as previously discussed.

In some embodiments of this invention, structure hanger 40' has two upper flanges 60, two lower flanges 70 and four column arms 50 each extending between upper flange 60 and lower flange 70. According to some embodiments of this invention, lower flange 70 is attachable to refractory brick flange 16, as shown in FIG. 1. Lower flange 70 can be releasably attached, such as for maintenance purposes, temporarily secured directly or indirectly to refractory brick flange 16 and/or any other suitable part of refractory brick 13. In some embodiments, the arms are longer, shorter, more vertical and/or more curved.

Figure 9:
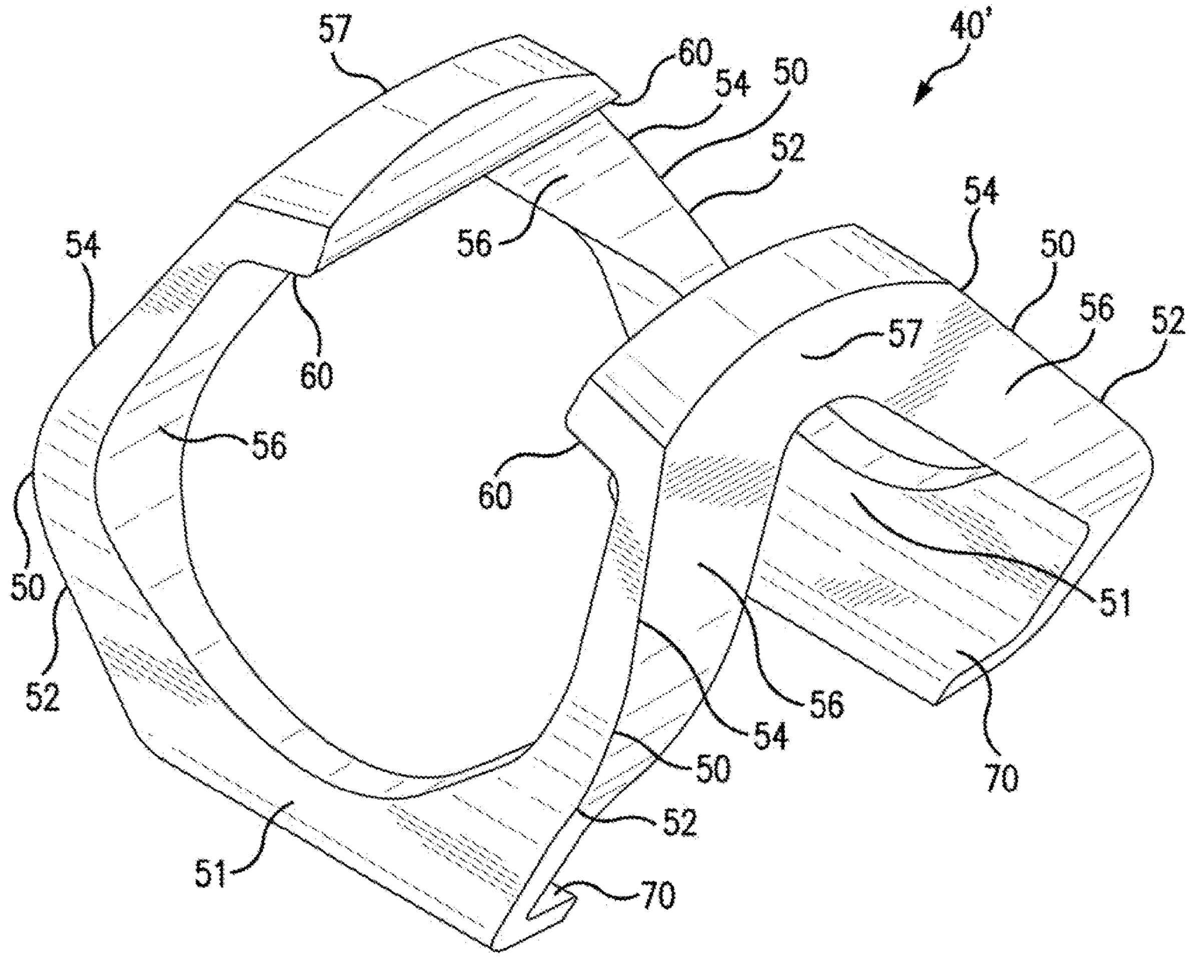
FIG. 9 is a perspective view of the structure hanger, according to another embodiment of this invention.
Figure 10:
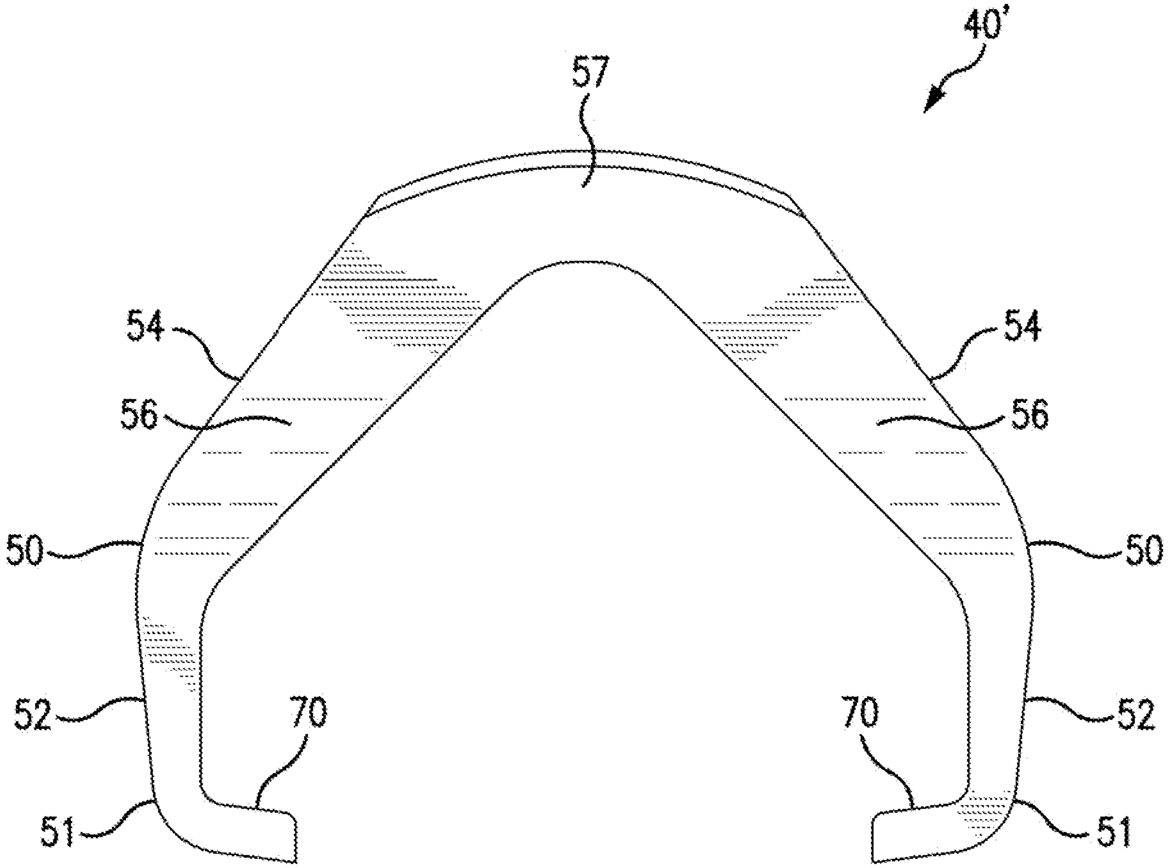
FIG. 10 is a side view of the structure hanger, as shown in FIG. 9.
Figure 11:
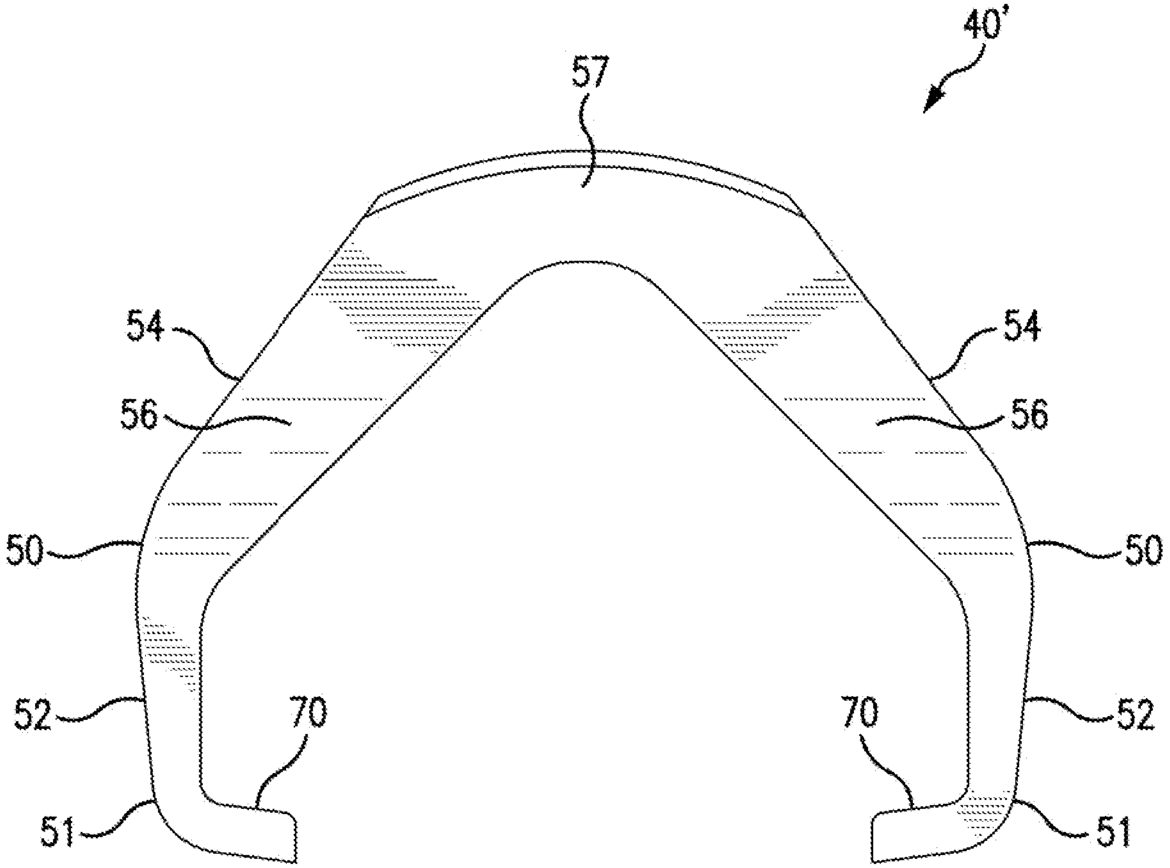
FIG. 11 is a side view, opposite the side view shown in FIG. 10, of the structure hanger.
Figure 12:
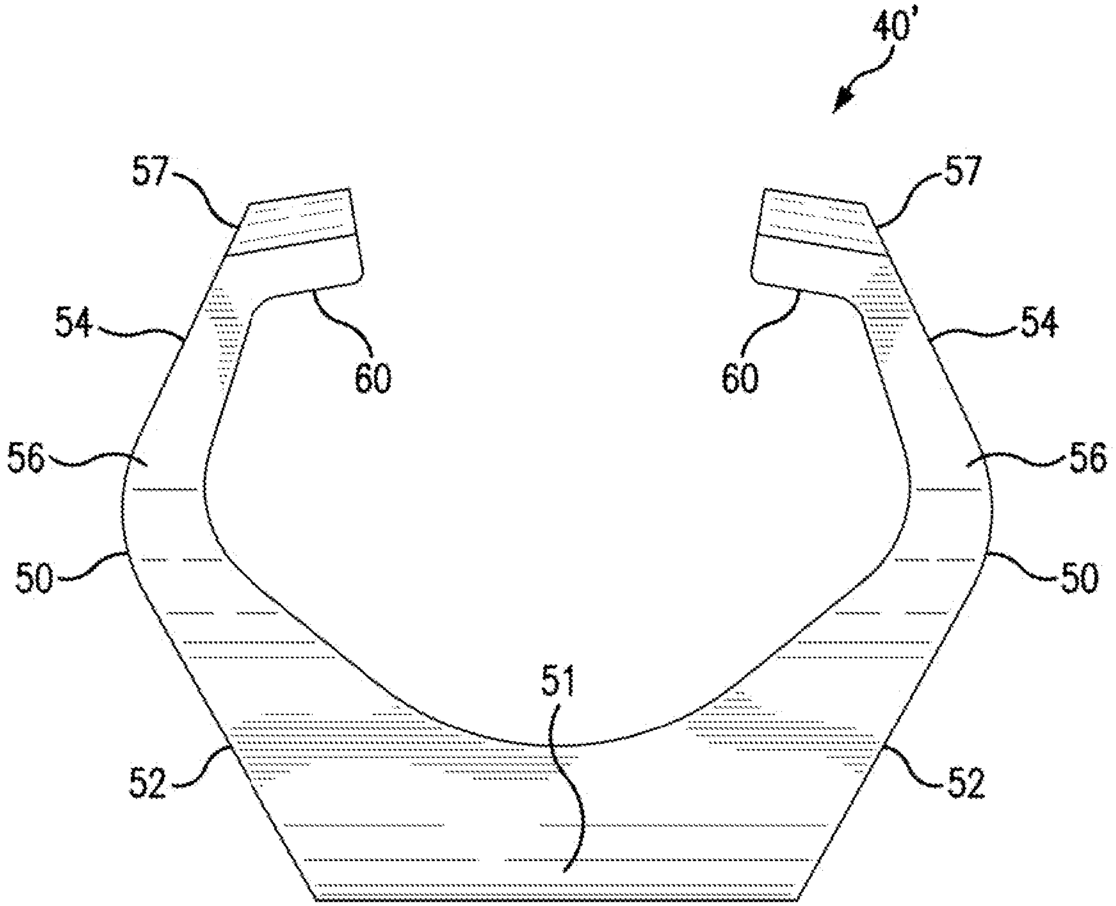
FIG. 12 is a front view of the structure hanger, as shown in FIG. 9.
Figure 13:
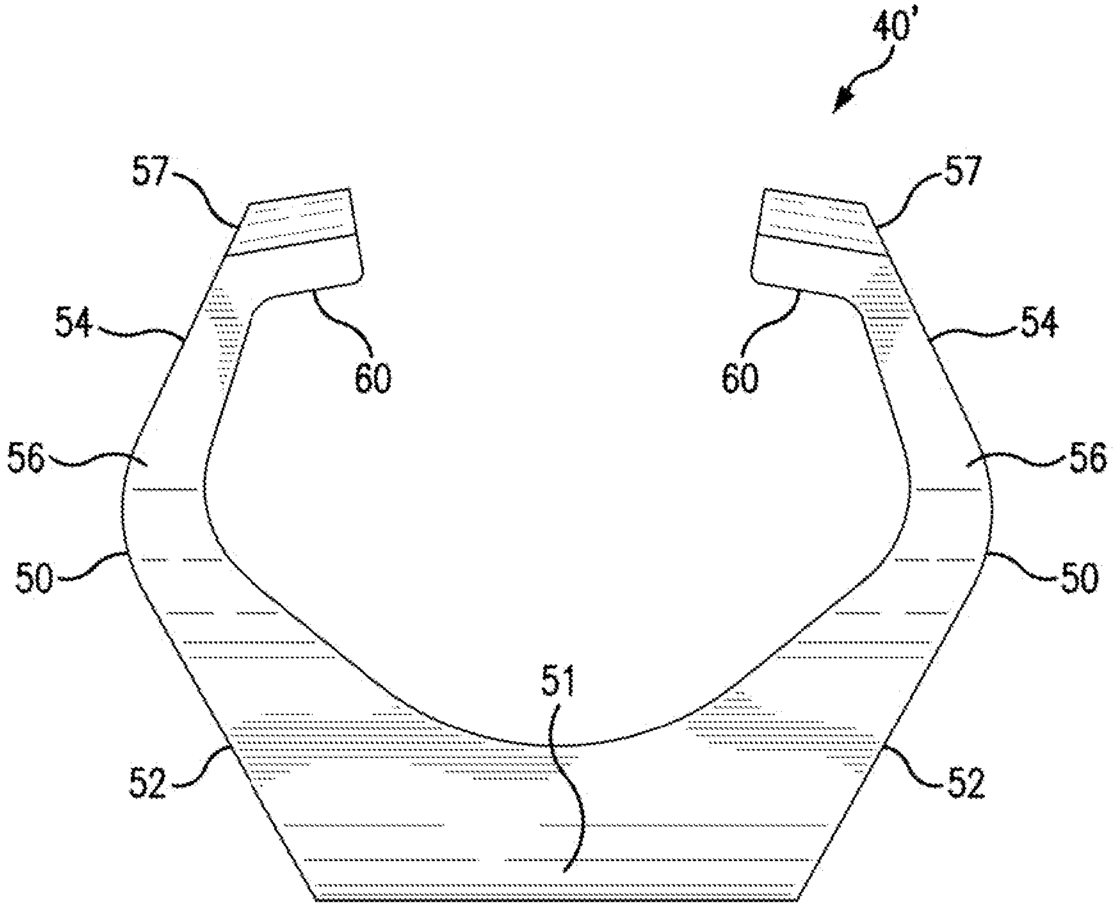
FIG. 13 is a rear view of the structure hanger, as shown in FIG. 9.
Figure 14:
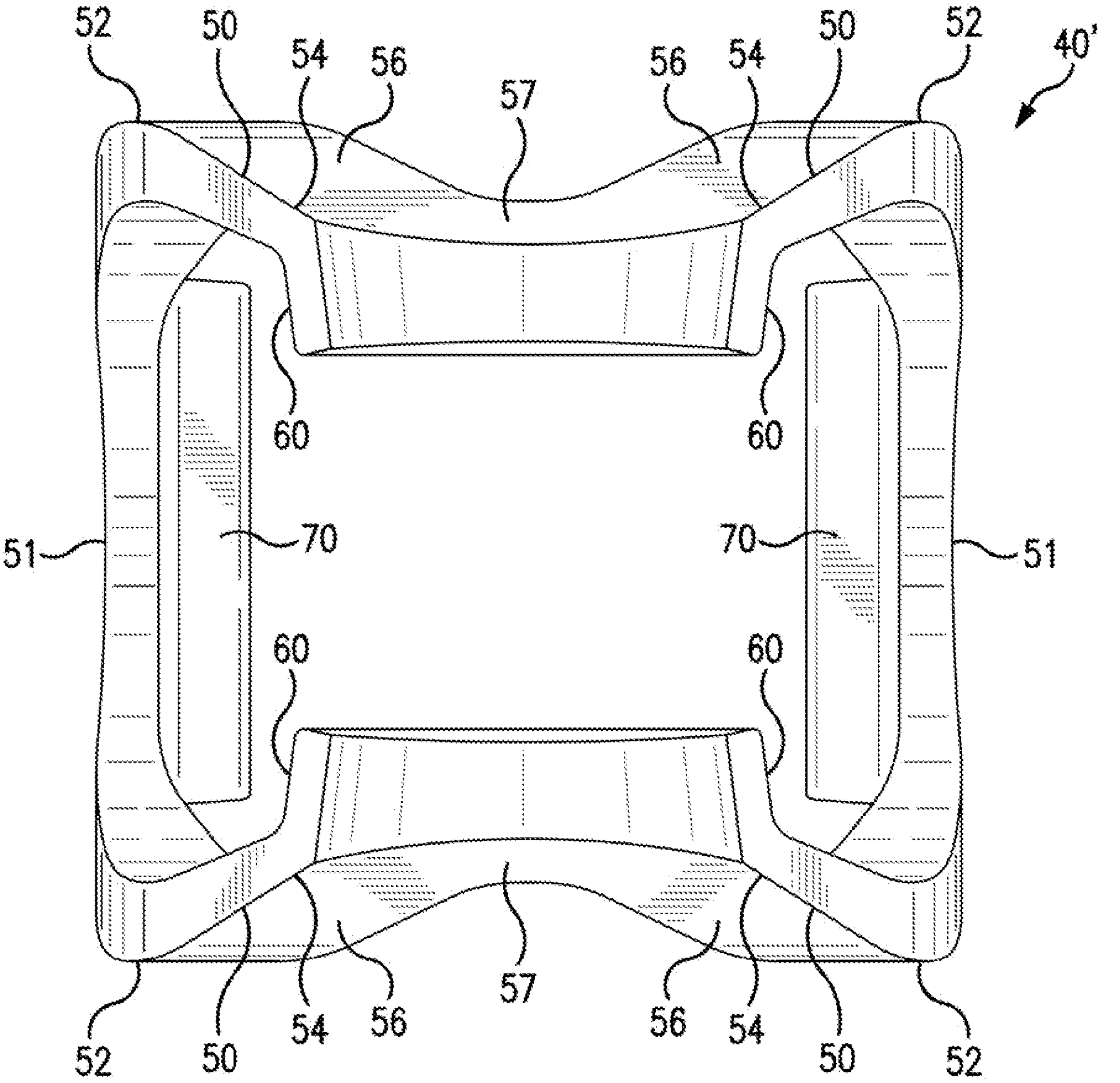
FIG. 14 is a top view of the structure hanger, as shown in FIG. 9.
Figure 15:
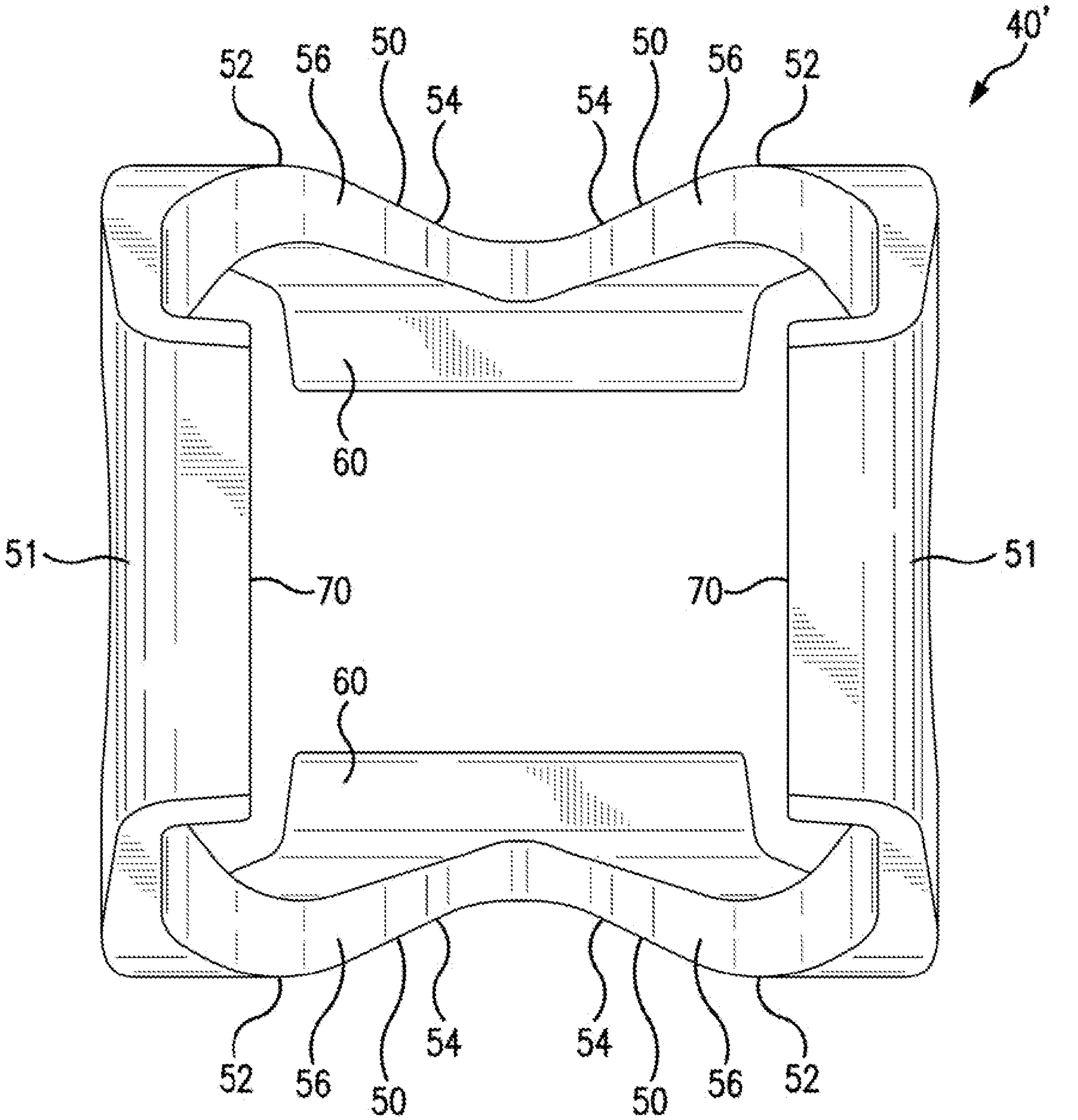
FIG. 15 is a bottom view of the structure hanger, as shown in FIG. 9.

In some embodiments of this invention, such as shown in FIGS. 2 and 9, the curved shape of column arm 50 is formed by lower curvature portion 52 leading into, merging into and/or otherwise following a direction into upper curvature portion 54. In some embodiments of this invention, lower curvature portion 52 is in a first spatial plane and upper curvature portion 54 is in a second spatial plane, and in some embodiments the first spatial plane and the second spatial plane are at an angle and/or are offset with respect to each other.

According to some embodiments of this invention, upper flange 60 is releasably attachable to a support structure, such as support beam 12 of the 519 Patent, for example, in a high temperature furnace structure.

In some embodiments of this invention, such as shown in FIGS. 2 and 9, an external cross-sectional surface of each column arm 50 is curved, non-linear and/or otherwise not straight. This particular shape of column arm 50 sometimes requires more manufacturing processes to accurately shape column arm 50.

According to some embodiments of this invention, a method for using structure hanger 40' in a high temperature furnace, includes forming a plurality of curved column arms 50, forming two upper flanges 60, and forming two lower flanges 70 so that each curved column arm 50 extends between a corresponding pair of upper flange 60 and lower flange 70. In some methods according to this invention, lower flanges 70 are removably attached, secured and/or otherwise connected to refractory brick flange 16 and/or another part of refractory brick 13.

In some embodiments according to this invention, structure hanger 40' is manufactured and/or fabricated from structural steel and/or formed by other known metal forming techniques.

While in the specification this invention has been described in relation to certain embodiments thereof, and many details have been set forth for purpose of illustration, it will be apparent to those skilled in the art that this invention is susceptible to additional embodiments and that certain of the details described herein can be varied considerably without departing from the basic principles of this invention.

What is claimed is:

1. A structure hanger comprising: a plurality of column arms, at least one upper flange, at least one lower flange, each said column arm extending between one said upper flange and one said lower flange, each said column arm having a curved shape, and two upper flanges and two lower flanges and four column arms each extending between said upper flange and said lower flange.

2. The structure hanger of claim 1, wherein said at least one lower flange is attachable to a refractory brick flange.

3. The structure hanger of claim 1, having two upper flanges and two lower flanges wherein said two upper flanges are generally parallel to each other and said two lower flanges are generally parallel to each other.

4. The structure hanger of claim 3, wherein said upper flanges are generally perpendicular to said lower flanges.

5. The structure hanger of claim 1, wherein said curved shape of each said column arm is formed by a lower curvature portion leading into an upper curvature portion.

6. The structure hanger of claim 5, wherein said lower curvature portion is in a first spatial plane and said upper curvature portion is in a second spatial plane, and said first spatial plane and said second spatial plane are offset with respect to each other.

7. The structure hanger of claim 1, wherein said at least one upper flange is attachable to a support beam in a high temperature furnace structure.

8. The structure hanger of claim 1, wherein an external cross-sectional surface area of each said column arm has a non-linear section.

9. A structure hanger comprising: a plurality of column arms, two upper flanges, two lower flanges, each said curved column arm extending between a corresponding pair of one said upper flange and one said lower flange, and two upper flanges and two lower flanges and four column arms each extending between said upper flange and said lower flange.

10. The structure hanger of claim 9, wherein said lower flanges are removably attached to a refractory brick flange.

11. The structure hanger of claim 9, wherein said two upper flanges are generally parallel to each other and said two lower flanges are generally parallel to each other.

12. The structure hanger of claim 11, wherein said upper flanges are generally perpendicular to said lower flanges.

13. The structure hanger of claim 9, wherein said upper flanges are removably attached to a support beam in a high temperature furnace structure.

14. The structure hanger of claim 9, wherein a curved shape of each said column arm is formed by a lower portion of said column arm merging into an upper portion of said column arm.

15. A method for using a structure hanger in a high temperature furnace, including the steps of: forming a plurality of curved column arms; forming two upper flanges; and forming two lower flanges so that each curved column arm extends between a corresponding pair of one upper flange and one lower flange, and two upper flanges and two lower flanges and four column arms each extending between said upper flange and said lower flange.

16. In the method according to claim 15, wherein the two upper flanges are generally parallel to each other and the two lower flanges are generally parallel to each other.

17. In the method according to claim 15, wherein the upper flanges are generally perpendicular to the lower flanges.

18. In the method according to claim 15, wherein the upper flanges are removably attached to a support beam in a high temperature furnace structure.

19. In the method according to claim 15, wherein the upper flanges are removably attached to a support beam in a high temperature furnace structure.

* * * * *